US007850867B2

(12) United States Patent
Liang et al.

(10) Patent No.: US 7,850,867 B2
(45) Date of Patent: *Dec. 14, 2010

(54) COMPOSITIONS FOR LIQUID CRYSTAL DISPLAY

(75) Inventors: Rong-Chang Liang, Cupertino, CA (US); HongMei Zang, Sunnyvale, CA (US); Haiyan Gu, Davis, CA (US)

(73) Assignee: SiPix Imaging, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/177,010

(22) Filed: Jul. 21, 2008

(65) Prior Publication Data

US 2008/0272334 A1 Nov. 6, 2008

Related U.S. Application Data

(60) Continuation of application No. 11/567,694, filed on Dec. 6, 2006, which is a division of application No. 10/771,848, filed on Feb. 4, 2004, now Pat. No. 7,182,830.

(60) Provisional application No. 60/445,258, filed on Feb. 4, 2003.

(51) Int. Cl.
C09K 19/00 (2006.01)
C09K 19/06 (2006.01)
C09K 19/52 (2006.01)

(52) U.S. Cl. .............................. 252/299.01; 252/182.3; 252/299.6; 252/299.63; 252/182.1; 252/182.11; 252/182.12; 428/1.1; 428/1.2; 428/1.21; 428/1.23; 428/1.3; 428/1.31; 428/1.32

(58) Field of Classification Search ............ 252/299.01, 252/299.6, 299.63, 182.1–182.12, 182.3, 252/299.1; 428/1.1–1.23, 1.3–1.32; 430/20, 430/270.1
See application file for complete search history.

(56) References Cited

U.S. PATENT DOCUMENTS

| 5,389,698 | A | 2/1995 | Chigrinov et al. |
| 5,539,074 | A | 7/1996 | Herr et al. |
| 5,570,216 | A | 10/1996 | Lu et al. |
| 5,729,242 | A | 3/1998 | Margerum et al. |
| 5,729,320 | A | 3/1998 | Eidenschink et al. |
| 5,745,094 | A | 4/1998 | Gordon, II et al. |
| 5,767,826 | A | 6/1998 | Sheridon et al. |
| 5,824,377 | A | 10/1998 | Pirwitz et al. |
| 5,934,780 | A | 8/1999 | Tanaka |
| 5,956,113 | A | 9/1999 | Crawford |
| 5,993,689 | A | 11/1999 | Kobayashi et al. |
| 5,998,563 | A | 12/1999 | Pirwitz et al. |
| 6,049,366 | A | 4/2000 | Hakemi et al. |
| 6,060,581 | A | 5/2000 | Yu et al. |
| 6,177,972 | B1 | 1/2001 | Held et al. |
| 6,313,389 | B1 | 11/2001 | Adachi |
| 6,727,873 | B2 | 4/2004 | Gordon, II et al. |
| 6,795,138 | B2 | 9/2004 | Liang et al. |
| 6,882,463 | B2 | 4/2005 | Motoi et al. |
| 7,095,477 | B2 | 8/2006 | Liang et al. |
| 7,182,830 | B2 | 2/2007 | Liang et al. |
| 7,471,369 | B2 * | 12/2008 | Liang .......................... 349/156 |
| 2005/0099575 | A1 | 5/2005 | Liang et al. |
| 2006/0262249 | A1 | 11/2006 | Liang et al. |
| 2007/0098921 | A1 * | 5/2007 | Liang et al. .................. 428/1.5 |

FOREIGN PATENT DOCUMENTS

| CN | 1180727 | 5/1998 |
| EP | 0 661 786 | 7/1995 |
| EP | 1 219 651 | 7/2002 |
| JP | 07120734 | 5/1995 |
| JP | 9-222605 A | 8/1997 |
| JP | 09278890 | 10/1997 |
| WO | WO 01/67170 | 9/2001 |
| WO | WO 02/48282 | 6/2002 |
| WO | WO 2004/070694 | 8/2004 |

OTHER PUBLICATIONS

*Allen, K. << Electrophoretics Fulfilled >>, iSuppli Corporation, Emerging Displays Review, Oct. 2003, pp. 9-14.
<< Newly-Developed Color Electronic Paper Promises—Unbeatable Production Efficiency >> Nikkei Microdevices, Dec. 2002 (in Japanese, with English translation).
Bardsley, J.N. & Pinnel, M.R. (Nov. 2004) Microcup™ Electrophoretic Displays. *USDC Flexible Display Report*, 3.1.2. pp. 3-12-3-16.
Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.
Chen, S.M., << The Applications for the Revolutionary Electronic Paper Technology >>, OPTO News & Letters, Jul. 2003, 102, pp. 37-41 (in Chinese, English abstract attached).
Chen, S.M., << The New Applications and the Dynamics of Companies >> , TRI, May 2003 (in Chinese, English abstract attached).
Chung, J. et al. << Microcup(R) Electrophoretic Displays, Grayscale and Color Rendition >>, IDW '03, Dec. pp. 243-246.
Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.
Ho, Andrew. (Nov. 2006) *Embedding e-Paper in Smart Cards, Pricing Labels & Indicators*. Presentation conducted at Smart Paper Conference Nov. 15-16, 2006, Atlanta, GA.

(Continued)

*Primary Examiner*—Geraldina Visconti
(74) *Attorney, Agent, or Firm*—Howrey LLP

(57) ABSTRACT

This invention relates to compositions and an assembly process for the manufacture of liquid crystal displays. The assembly process is especially advantageous because it can be easily scalable to roll-to-roll continuous manufacturing of liquid crystal displays. The invention is directed to a photo-alignable top-sealing composition for top-sealing a liquid crystal display cell.

27 Claims, 3 Drawing Sheets

OTHER PUBLICATIONS

Ho, C., FEG, Dec. 23, 2003, NeiLi, Taiwan.

Ho, Candice. (Feb. 1, 2005) *Microcupt® Electronic Paper Device and Applicaiton*. Presentation conducted at USDC 4th Annual Flexible Display Conference 2005.

Hou, J., Chen, Y., Li, Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Display/Electronic Paper—A Technology Overview*. Paper presented at the METS 2004 Conference in Taipie, Taiwan.

Liang, R.C. and Lee, H., << SiPix Microcup(R) Electronic Paper—An Introduction >>, Advanced Display, Jun. 2003, Issue 3, pp. 4-9 (in Chinese, English abstract attached).

Liang, R.C. and Tseng, S., Microcup(R) LCD, A New Type of Dispersed LCD by A Roll-to-Roll Manufacturing Process >>, IDMC '03, Feb. 18-21, Taipei, Liang, Paper We-02-04.

Liang, R.C. et al, << Microcup Electrophoretic Displays by Roll-to-Roll Manufacturing Processes >>, IDW '02, Dec. 4-6, pp. 1337-1340.

Liang, R.C. et al, << Microcup(R) Active and Passive Matrix Electrophoretic Displays by A Roll-to-Roll Manufacturing Processes >>, SID Digest, May 21-22, 2003, 20.1/R.C. Liang.

Liang, R.C. et al, << Microcup(R) displays : Electronic Paper by Roll-to-Roll Manufacturing Processes >>, Journal of the SID, vol. 11/4, Feb. 18-23, 2003, pp. 621-628.

Liang, R.C. et al, << Passive Matrix Microcup(R) Electrophoretic Displays >>, IDMC '03, Feb. 18-21, Taipei, Liang, Paper Fr-17-5.

Liang, R.C., (Feb. 2005) *Flexible and Roll-able Displays/Electronic Paper—A Brief Technology Overview*. Flexible Display Forum, 2005, Taiwan.

Liang, R.C., Zang, H.M., Wang, X., Chung, J. & Lee, H., (Jun./Jul. 2004) << Format Flexible Microcup (R) Electronic Paper by Roll-to-Roll Manufacturing Process >>, Presentation conducted at the 14th FPD Manufacturing Technology EXPO & Conference.

Liang, R.C., <<Microcup(R) Electrophoretic and Liquid Crystal Displays by Roll-to-Roll Manufacturing Processes >>, USDC Flexible Microelectronics & Displays Conference, Feb. 3-4, 2003, Phoenix, Arizona, USA.

Wang, X., Kiluk, S., Chang, C., & Liang, R.C. (Feb. 2004). Mirocup (R) Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51.

Wang, X., Li, P., Sodhi, D., Xu, T. and Bruner, S. et al., (Feb. 2006) *Inkjet Fabrication of Multi-Color Microcup® Electrophorectic Display*. the Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, pp. 1587-1589.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging*, SPIE vol. 5289, 102-108.

Zang, H.M. & Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Zang, H.M. (Feb. 2004). *Microcup Electronic Paper*. Presentation conducted at the Displays & Microelectronics Conference of U.S. Display Consortium, Phoenix, Arizona, USA.

Zang, H.M., Hwang, J.J., Gu, H., Hou, J., Weng, X., Chen, Y., et al. (Jan. 2004). *Threshold and Grayscale Stability of Microcup (R) Electronic Paper*. Proceeding of SPIE-IS&T Electronic Imaging, SPIE vol. 5289, 102-108.

Zang, H.M., Spectrum 2003, Advisory Board Meeting, Bowling Green State University, Ohio, Oct. 23, 2003.

Zang, H.M., SPIE 2004 Electronic Imaging Science and Technology, Jan. 19, 2004.

Zang, HM., (Feb. 2007) *Developms in Microcup® Flexible Displays*. Presentation conducted at the 6th Annual Flexible Display and Microelectronics Conference, Phoenix, AZ Feb. 6-8.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

\* cited by examiner

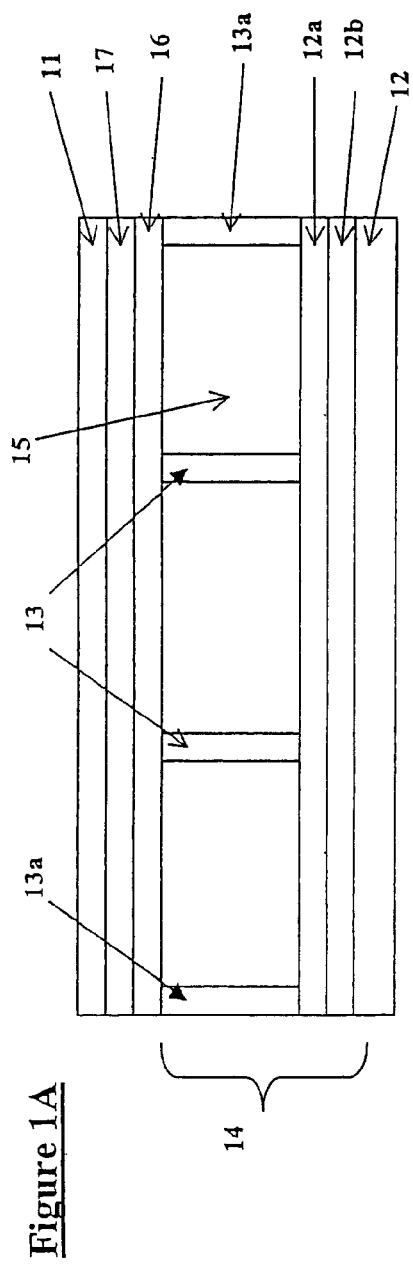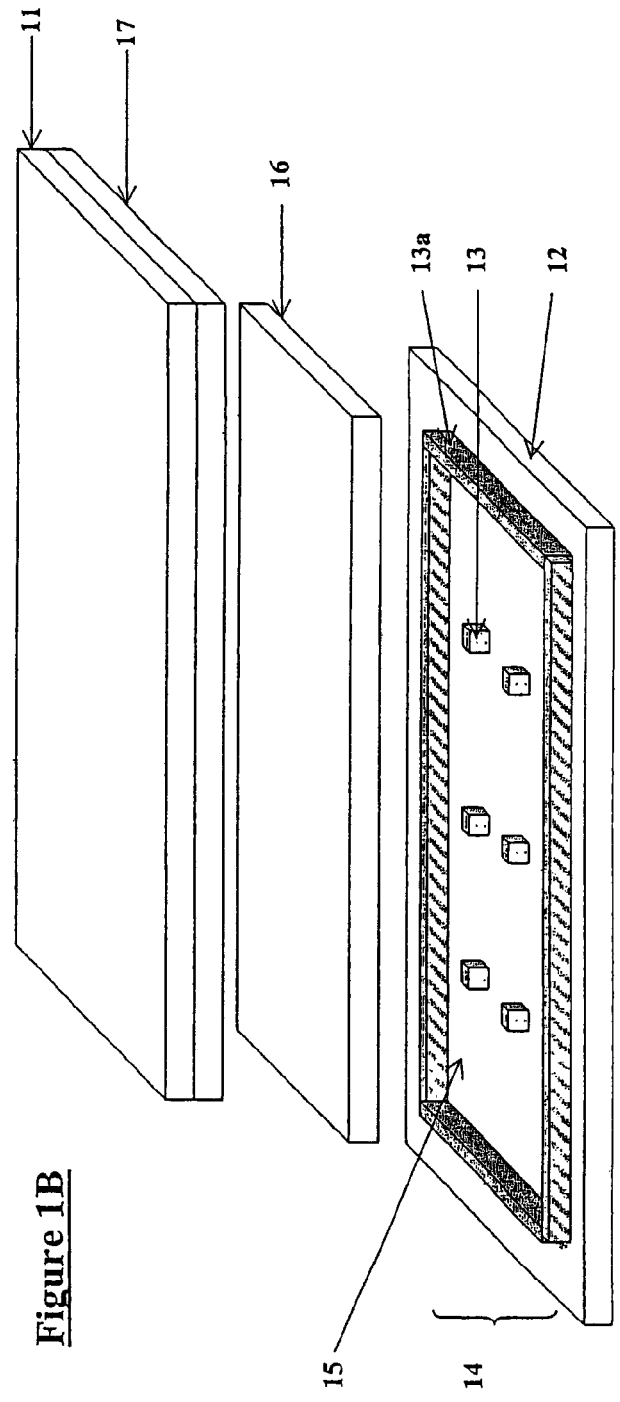

COMPOSITIONS FOR LIQUID CRYSTAL DISPLAY

This application is a continuation of U.S. application Ser. No. 11/567,694, filed Dec. 6, 2006; which is a divisional application of U.S. application Ser. No. 10/771,848, filed Feb. 4, 2004, now U.S. Pat. No. 7,182,830; which claims the benefit of U.S. Provisional Application No. 60/445,258, filed Feb. 4, 2003; the above applications are incorporated herein by reference in their entirety.

BACKGROUND OF THE INVENTION (a) Field of the Invention

This invention relates to novel compositions and an assembly process for the manufacture of liquid crystal displays.

(b) Background

Liquid crystal displays (LCDs) have been the predominate display choice for decades for many applications including watches, radios, PDAs, portable computers, tablet computers and projection TVs because of their flatness, light weight, high definition, low driving voltages and low power consumption. However, even with many improvements in materials and assembly processes, large-size LCDs are still very difficult and time-consuming to manufacture.

The basic components of a typical LCD consist of a thin layer of liquid crystals, two plates each coated with an alignment layer and a pair of polarizers. In a typical LCD assembly process, the first step involves the preparation of the electrode plates. For active matrix color displays, the deposition and patterning of color filter elements are often carried out on the top electrode plate and the formation of thin film transistors and metal interconnect lines is carried out on the bottom plate. For passive color displays, transparent electrodes are patterned on both facing plates in perpendicular arrays and color filters on the viewing plate provide the full color display. After the electrode plates are prepared, alignment layers are then coated on the electrode plates and rubbed or buffed carefully to control the orientation and pretilt angle of the liquid crystals. The top and the bottom plates are then joined together using an edge seal adhesive with small hole(s) open for injection of a liquid crystal (LC) composition by, for example, a vacuum filling process, into the gap between the two plates. Spacers such as mono-dispersed particles, fibers or relief patterns prepared by lithography are used to precisely control the cell gap. Finally, the holes are filled with a sealant and the display cell is laminated with polarizer films and optionally a retardation film, compensation film or light management film, connected with driver circuitry, and assembled with a backlight unit and a frame to complete the display assembly.

In the conventional LC injection process, the space created between the two plates is evacuated and the LC composition is introduced into the cell through the hole(s) left in the edge sealant. This step results in significant waste of the LC composition and is typically a very slow process particularly for LCDs having a narrow cell gap. As the display size increases, the time required for the LC filling using the conventional process increases dramatically. The requirement of a narrower cell gap, in-plane switching (IPS) for a high speed or wide viewing angle renders the LC filling step even slower. For example, 4 to 6 hours of the filling and sealing time is typically required for a 15" LCD and up to 20 hours has been reported for a 22" LCD. Review of the traditional LCD assembling processes can be found in "Liquid Crystal Flat Panel Displays: Manufacturing Sciences & Technology" by W. C. O'Mara (1993); "Flat Panel Display Handbook", Display Industry Technology Review, 2nd ed., (2000) by Stanford Resource, Inc. and "Flat Panel Display 2002 Yearbook" by Nikkei Microdevices.

Filling the LC composition before assembling the two electrode plates (i.e., the "LC dropping method") has been disclosed to shorten the LC filling time [see S. Yamada et al in SID 01 Digest, pp. 1350 (2001); H. Kamiya et al, in SID 01 Digest, pp. 1354 (2001) and references cited therein]. The LC dropping process includes (1) applying a UV edge sealant on an electrode plate, (2) dropping the liquid crystals onto the surface, (3) assembling display cell by adhering a second substrate under vacuum to the first electrode plate via the edge sealant, and (4) hardening the sealant by, for example, UV. The process reduces the LC filling time and also reduces waste of the expensive LC material. However, the process is not straight-forward for the production of large display panels. First of all, a vacuuming step is needed to assemble the display cell. Secondly, a precise volume of the LC composition must be dripped onto the plate. Use of excess of the liquid crystal composition may result in defects or poor adhesion due to undesirable contamination of the sealant by the LC composition. On the other hand, insufficient liquid crystal composition tends to result in undesirable air pockets trapped in the display cell. As the panel becomes larger and the glass substrate becomes thinner, the electrode plate may be bended by vacuum and deviation of the LC volume in the cell may occur. This is particularly true when soft or mobile spacers are used to define the cell gap. Thirdly, non-uniform hardening of the edge sealant may occur due to the presence of opaque patterns in most TFT (thin film transistor) LCDs. Finally, this process is difficult to scale up to roll-to-roll manufacturing.

Roll-to-roll filling and sealing processes have been disclosed in a copending patent application Ser. No. 09/759,212 (corresponding to 2002-0126249), for dispersed type LCDs. The content of this co-pending application is incorporated herein by reference in its entirety. However, the two continuous filling/top-sealing processes disclosed therein are not useful for most LCDs if an alignment layer is needed to control the orientation and pretilt angle of the liquid crystals.

SUMMARY OF THE INVENTION

This invention is directed to novel compositions and an assembly process for the manufacture of liquid crystal displays. The assembly process is especially advantageous because it can be easily scalable to roll-to-roll continuous manufacturing of liquid crystal displays.

The first aspect of the invention is directed to a photoalignable top-sealing composition for top-sealing a liquid crystal display cell. The photoalignable top-sealing composition may comprise a photoalignable polymer, oligomer or a precursor thereof and a sealing solvent or solvent mixture. The photoalignable top-sealing composition is immiscible with the liquid crystal composition and has a specific gravity no greater than or preferably lower than that of the liquid crystal composition.

The second aspect of the present invention is directed to a group of novel photoalignment polymers, oligomers and precursors thereof suitable to be used in a photoalignable top-sealing composition.

The third aspect of the invention is directed to processes for top-sealing a liquid crystal display cell.

The fourth aspect of the invention is a novel assembly process for liquid crystal devices.

The fifth aspect of the invention is directed to a liquid crystal display wherein the display cell is top-sealed by a photoalignable top-sealing composition of the present invention, in particular a photoalignable top-sealing composition comprising a novel photoalignable polymer, oligomer or a precursor thereof of the present invention.

BRIEF DESCRIPTION OF THE DRAWINGS

FIG. 1A illustrates a typical cross-section view of a liquid crystal display prepared by the assembly process of the present invention. FIG. 1B is the schematic drawing showing the three-dimensional view.

DETAILED DESCRIPTION OF THE INVENTION

Figure 2:
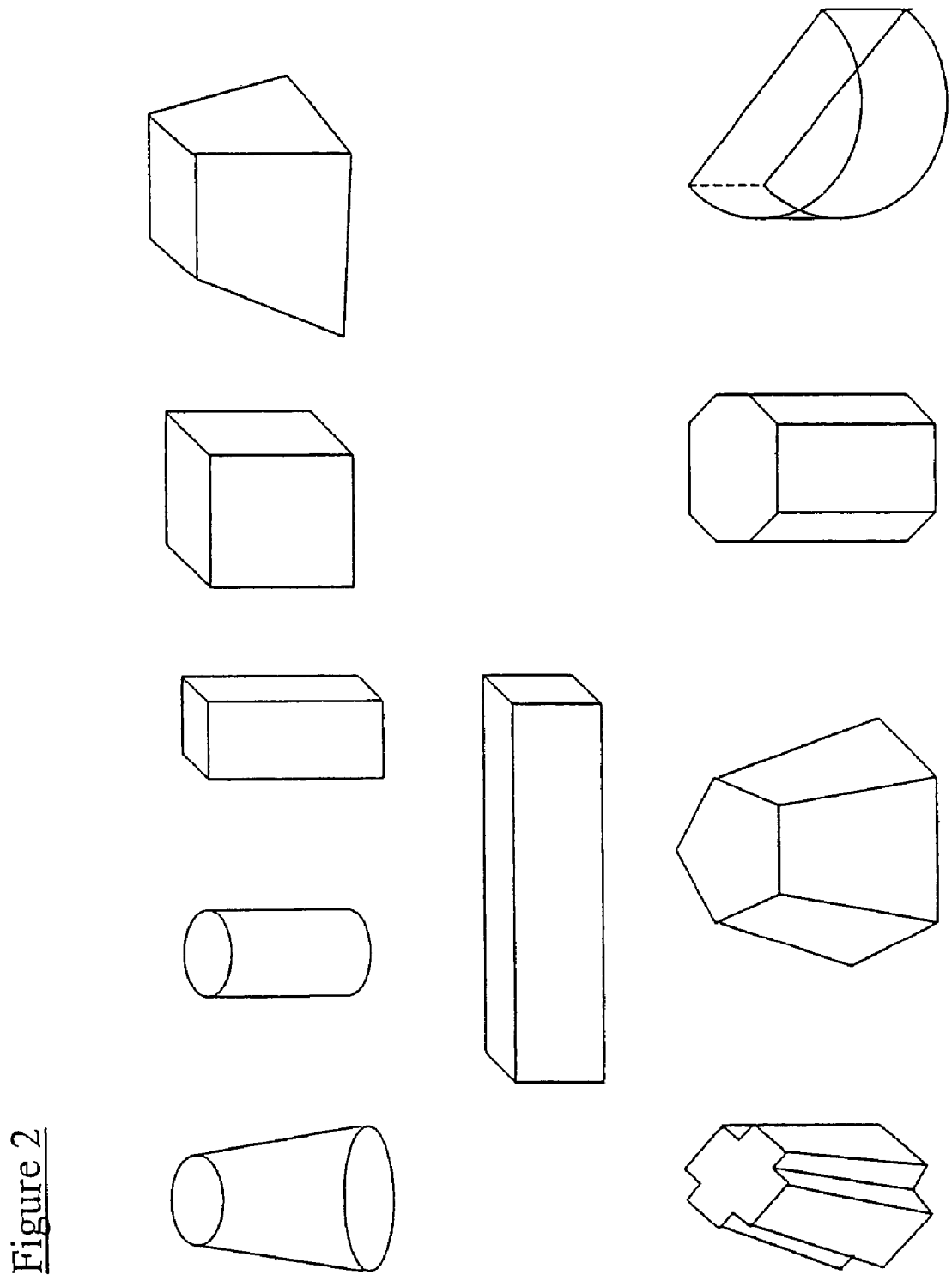
FIG. 2 illustrates several typical spacers built on the bottom substrate of the present invention.

Unless defined otherwise in this specification, all technical terms are used herein according to their conventional definitions as they are commonly used and understood by those of ordinary skill in the art.

For example, the term "alkyl" refers to an optionally unsaturated linear hydrocarbon radical of 1 to 30 carbon atoms, or an optionally unsaturated branched or cyclic hydrocarbon radical of 3 to 30 carbon atoms. Exemplary alkyl groups are methyl, ethyl, cyclopropylmethyl, cyclohexyl, cyclohexylmethyl, octyl, n-decyl, ethenyl, 3-hexenyl, and the like. The term "alkoxy" refers to the group —O—$R^a$ wherein $R^a$ is an alkyl as defined above. The term "aryl" refers to an organic radical derived from an aromatic hydrocarbon having 3 to 18 carbon atoms including, but not limited to, phenyl, naphthyl, anthracenyl and the like. The term "alkylene" or "phenylene" refers to an alkyl or phenyl moiety respectively which may be substituted at two sites (e.g., two ends).

All publications, patent applications and patents cited in this specification are incorporated by reference in this application as if each individual publication, patent application or patent were specifically and individually indicated to be incorporated by reference.

A typical LCD prepared according to the assembly process of the present invention is shown in FIG. 1A. The display typically has a top (i.e., the second) substrate (11) and a bottom (i.e., the first) substrate (12). Each of the top (11) and the bottom (12) substrates may comprise a conductor layer or only one of the substrates comprises a conductor layer.

On the bottom substrate (12), there are the first alignment layer (12a) and optionally a conductor layer (12b). The bottom substrate may not comprise the first alignment layer (12a); but this option is less preferred.

Spacers (13) and edge walls (13a) are built by, for example, printing, coating or photolithography on the first alignment layer (12a) to control precisely the cell gap (i.e., the distance between the top and bottom substrates, or more precisely, the distance between the two alignment layers, 12a and 16). The spacers built on the first alignment layer (12a) may be of any shape, preferably with a flat top surface. Some non-limiting examples of the spacers are shown in FIG. 2.

A liquid crystal composition (15) is filled into the top-opened display cell(s) (14) which is/are top-sealed with a photoalignable sealing layer (16). The top substrate (11) which may comprise a transparent conductor layer (not shown) is finally disposed on the top-sealed display cell(s), optionally with an adhesive layer or overcoat (17) which may itself be a photoalignable layer or a pre-aligned layer. The top substrate (11) may be disposed by a method such as lamination, coating, printing, vapor deposition, sputtering or a combination thereof onto the photoalignable top-sealing layer (16) or onto the adhesive or overcoat layer (17). The top (11) or the bottom (12) substrate may have additional layers (not shown) such as a color filter, a moisture or oxygen barrier or an optical compensation layer. Finally, polarizer film(s) (not shown) and/or other light management film(s) may be applied to the assembled display panel.

It is understood that the present invention is applicable to all types of LCDs. For example, it is applicable to both the passive and active addressing LCDs. For the passive LCD, the top and bottom electrodes are patterned on the two substrates in a perpendicular manner. In an active LCD, one of the substrates (11 and 12) may be a TFT (thin film transistor) backplane and the other substrate may be a non-patterned common conductor layer or an insulator layer (in-plane switching). The substrate layers may be a polymeric film or sheet, glass, metal or metal oxide or the like.

I. Photoalignable Top-Sealing Composition

In one embodiment, the photoalignable top-sealing composition may comprise a photoalignable polymer, oligomer or a precursor thereof dissolved or dispersed in a sealing solvent or solvent mixture. The photoalignable top-sealing composition has a specific gravity no greater than, preferable less than, that of the LC composition and is immiscible with the LC composition.

Suitable photoalignable polymers, oligomers and precursors thereof for the top-sealing composition typically comprise a photoalignable functional group on the main chain or a side chain.

In one embodiment, the photoalignable top-sealing composition may comprise a photoalignable polymer, oligomer or a precursor thereof comprising a hydrocarbon repeating unit and a photoalignable functional group on the main chain or a side chain.

In another embodiment, the photoalignable top-sealing composition may comprise a photoalignable polymer, oligomer or a precursor thereof comprising a siloxane repeating unit and a photoalignable functional group on the main chain or a side chain.

In still another embodiment, the photoalignable top-sealing composition may comprise a photoalignable polymer, oligomer or a precursor thereof comprising an acrylate, methacrylate or vinyl repeating unit and a photoalignable functional group on the main chain or a side chain.

In still another embodiment, the photoalignable top-sealing composition may comprise a photoalignable condensation polymer or oligomer comprising a repeating unit such as a condensate of urethane, urea, carbonate, ester, amide, sulfone, imide, epoxide or formaldehyde and a photoalignable functional group on the main chain or a side chain.

In a further embodiment, the photoalignable top-sealing composition may comprise a random copolymer, a graft copolymer, a branch copolymer or a block copolymer comprising a photoalignable group in the main chain or a side chain.

In yet a further embodiment, the photoalignable top-sealing composition may comprise a block copolymer with at least one photoalignable block comprising a photoalignable functional group on the main chain or a side chain and another block(s) that is/are compatible with the sealing solvent or other non-photoalignment polymer(s) such as binder(s) or thickener(s), if present, in the top-sealing composition.

In yet a further embodiment, the photoalignable top-sealing composition may comprise a graft copolymer with at least one photoalignable graft chain and a main chain that is compatible with the sealing solvent or other non-photoalignable polymers such as binder(s) or thickener(s), if present, in the top-sealing composition.

In still another embodiment, the photoalignable top-sealing composition may comprise a precursor of the above-mentioned photoalignable polymers or oligomers and a photoalignable polymer or copolymer may be formed in-situ from the precursor before or during the hardening or photo-aligning of the top-sealing composition. The photoalignable precursor may be dissolved or dispersed in a sealing solvent or solvent mixture that is immiscible with the LC composition. Such useful precursors may include, but are not limited to, a copolymer of isocyanatoethyl acrylate and a cinnamate compound end-capped with a hydroxyl or amino group. Alternatively, the photoalignable polymer precursors may comprise (1) a diol or diamine having, for example, a cinnamate group, and (2) their complementary multifunctional isocyanates or epoxides which may react with (1) to form in-situ photoalignable polymers or oligomers.

The functional group referred to above may be cinnamate, coumarin, chalcony, benzolidenenaphthalidine, benzaylideneacetophenone, diphenylacetylene, stilbazole, stilbene, diphenylacetylene, diazo, spiropyran or the like. It may also be a heteroderivative of a functional group identified above. The term "heteroderivative" is understood throughout this application to include a functional group in which one or more carbon atoms is/are replaced with a heteroatom(s) such as oxygen, nitrogen or sulfur.

In addition to the conditions that the photoalignment top-sealing composition must be immiscible with the liquid crystal composition and has a specific gravity which is no greater than that of the liquid crystal composition, the top-sealing composition must also have acceptable tenting, wetting and adhesion properties.

Certain novel photoalignable polymers, oligomers or precursors thereof disclosed in Section II below are particularly suitable for the photoalignment top-sealing composition of the present invention.

Suitable sealing solvents may include, but are not limited to, straight, branched or cyclic $C_{1-12}$ hydrocarbons, $C_{1-4}$ alcohols, water and the like, or mixtures thereof. Solvents with a low boiling temperature and a low specific gravity are particularly useful. Suitable hydrocarbon solvents include, but are not limited to, hexane, cyclohexane, heptane, octane, nonane, decane, decalin and the like. Suitable alcohol solvents include, but are not limited to, methanol, ethanol, 1-propanol, 2-propanol, 1-butanol, 2-butanol, t-butanol and the like.

Typical concentration of the photoalignable polymer, oligomer or a precursor thereof in the sealing solvent or solvent mixture is in the range of about 3 to about 25% by weight, preferably in the range of about 5 to about 15% by weight. The concentration may be varied to achieve optimal viscosity and surface tension of the sealing composition.

In one embodiment, the sealing composition may have a viscosity of higher than 50 cps, preferably between about 50 to about 10000 cps and more preferably about 100 to about 5000 cps at room temperature.

A thickener may also be used to increase the viscosity, particularly when a low molecular weight photoalignable polymer, oligomer or a precursor thereof is used. When the composition is dissolved or dispersed in a hydrocarbon solvent, suitable thickeners may include high molecular weight binders such as polysiloxane, polyisoprene or polybutadiene block copolymers (e.g., Kraton thermoplastic elastomers from Kraton Polymers, Houston, Tex.), poly(dodecyl acrylate)s or poly(dodecyl methacrylate)s. When the composition is dissolved or dispersed in a lower alcohol, suitable thickeners may include polyvinyl butyrals and hydroxypropyl celluloses.

To increase the useful or addressable area of a LC display, it is highly desirable to reduce the number of the spacers and the total area occupied by the spacers. However, as the total area or number of the spacers decreases, the degree of difficulty to top-seal the filled LC cell(s) increases. To achieve a satisfactory seamless top-sealing, it is critical to have a sealing composition with good tenting properties to hold the top-sealing layer on the spacers and the edge walls throughout the entire assembling process.

In addition, the sealing layer must have a minimum thickness in order to "tent" over the supporting spacers and edge walls. The minimum thickness for optimal tenting may depend on the LC composition used. In one embodiment, the thickness of the photoalignable top-sealing layer of the present invention may be in the range of about 1 to about 20 microns, preferably about 1 to about 8 microns and more preferably about 2 to about 4 microns.

To improve the tenting properties, the top-sealing composition preferably also has good wetting properties over the edge walls and spacers. In one embodiment, a top-sealing composition having a surface tension lower than that of the LC composition to be enclosed may be used to improve the tenting properties. A surfactant may be used to reduce the surface tension. Useful surfactants include, but are not limited to, the FC surfactants from 3M Company, Zonyl fluorosurfactants from DuPont, fluoroacrylates, fluoromethacrylates, fluoro-substituted long chain alcohols, perfluoro-substituted long chain carboxylic acids or derivatives thereof and Silwet surfactants from OSi. Alternatively, a low surface tension solvent, such as hexane, heptane or Isopar, may be used to formulate the sealing composition.

Additional spacer particles or fibers, preferably those with very narrow size distribution, may also be added into the photoalignable top-sealing composition to improve control of the cell gap and the tenting properties.

The photoalignable top-sealing composition may further comprise non-photoalignable polymer(s) and additive(s). Useful non-photoalignable polymers for the top-sealing composition may be those mentioned above as binders or thickeners. Useful additives for the photoalignable top-sealing composition may include low molecular weight (less than 1000) photoalignable dichroic compounds such as azobenzenes, stilbenes or spiropyrans.

II. Novel Photoalignable Polymers, Oligomers and Precursors Thereof

The following group of novel photoalignable polymers, oligomers or precursors thereof are particularly suitable for the photoalignable top-sealing composition of the present invention. The methods for their synthesis are also given.

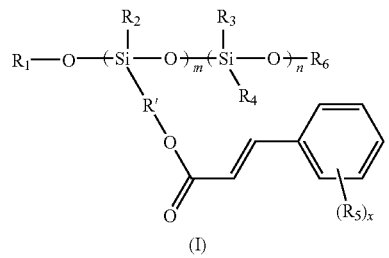

Formula I
(I)

wherein x is an integer of 1-5;
m and n are integers and their sum is $\geq 20$, preferably $\geq 50$,
$R_1$, $R_2$, $R_3$, $R_4$ and $R_5$ are independently alkyl, aryl, alkylaryl or their heteroatom derivatives thereof, preferably having 1-12 carbon atoms, substituted or unsubstituted alkylsilyl derivatives; and R' is a linking group such as alkylene, cycloalkylene or phenylene.

The term "heteroderivative" or "heteroatom derivative" is defined as a derivative of the alkyl, aryl or alkylaryl in which one or more carbon atoms is/are replaced with heteroatom(s) such as oxygen, nitrogen or sulfur.

Polysiloxanes of Formula (I) with a photoalignable group may be synthesized according to Reaction Scheme (I) shown below. To prepare the copolymer of Formula (I) wherein $R_1=R_6=Si(CH_3)_3$, $R_2=R_3=R_4=CH_3$, and R'=

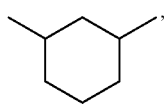

cinnamic acid may be first reacted with thionyl chloride to form the corresponding acyl chloride which subsequently is reacted with 3-cyclohexen-1-ol to form a vinyl containing cinnamate derivative. Hydrosilylation of the resultant cinnamate derivative with poly(methylsiloxane) in the presence of Speier's catalyst results in a polysiloxane containing a photoalignable cinnamate side chain. Various copolymers of the polysiloxane of Formula (I) may also be synthesized to optimize the glass transition temperature (Tg) of the polymer and compatibility with solvents such as methanol, ethanol, isopropanol, hexane, cyclohexane, isopars or other hydrocarbon solvents that are immiscible with most liquid crystals. To further adjust the solubility of the photoalignment polymer in the above-mentioned solvents and its incompatibility with the liquid crystals, the substituents $R_1$, $R_2$, $R_3$, $R_4$ and $R_5$ and the linking group R' may be independently fluorinated.

Rection Scheme (I)

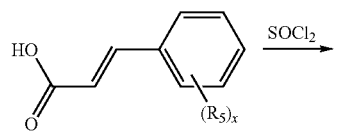

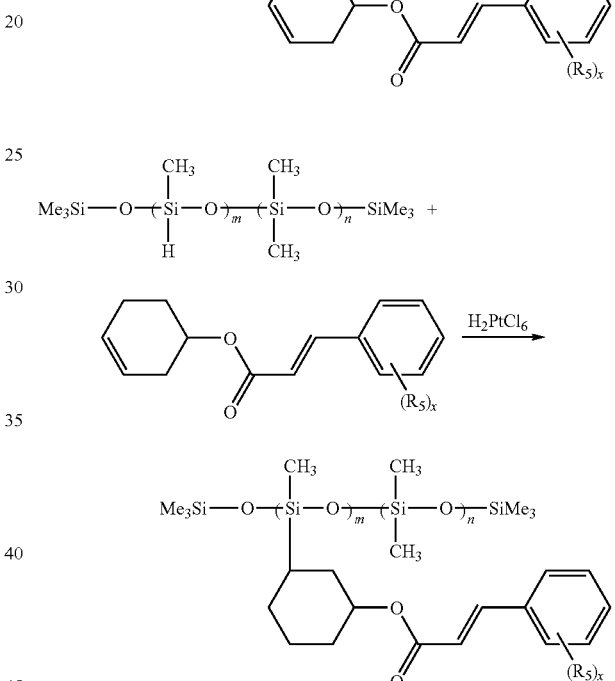

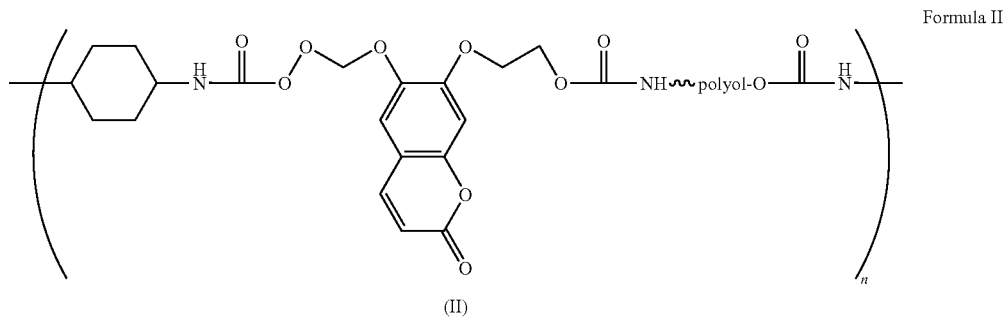

Formula II (II)

wherein n is integer ≧1, preferably ≧10 and more preferably ≧50; and the polyol moiety may be formed from polyethylene glycol, polypropylene glycol, poly tetramethylene glycol, polyester diol, polyalkylene diol or a fluorinated polyether diol.

Polyurethanes of Formula (II) with a photoalignable coumarin group on the main chain may be synthesized according to Reaction Scheme (II) below. For example, 6,7-dihydroxycoumarin is first treated by ethylene carbonate to afford a dihydroxyethoxy-functionalized coumarin which in turn is reacted with cyclohexane diisocyanate and a polyol to form a polyurethane of Formula (II).

wherein n is an integer ≧1, preferably ≧10 and more preferably ≧50; and the polyol moiety may be formed from polyethylene glycol, polypropylene glycol, poly tetramethylene glycol, polyester diol, polyalkylene diol or a fluorinated polyether diol.

Photoalignable polyurethanes of Formula (III) with cinnamate groups on the main chain may be synthesized by Reaction Scheme (III) as shown below.

Reaction Scheme (II)

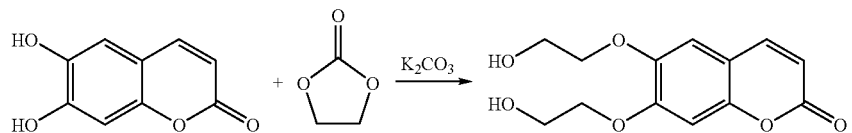

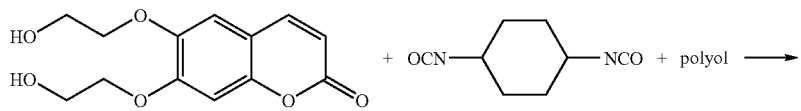

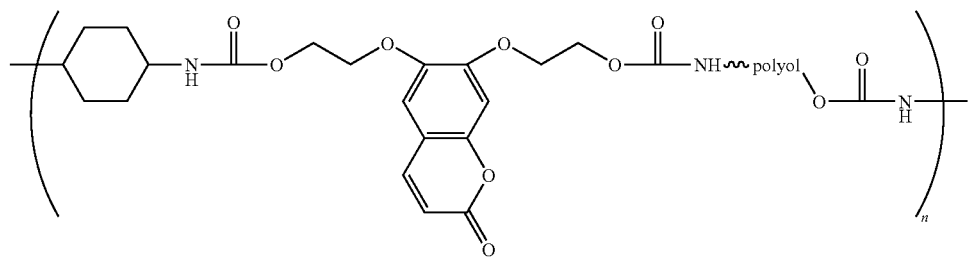

Formula III

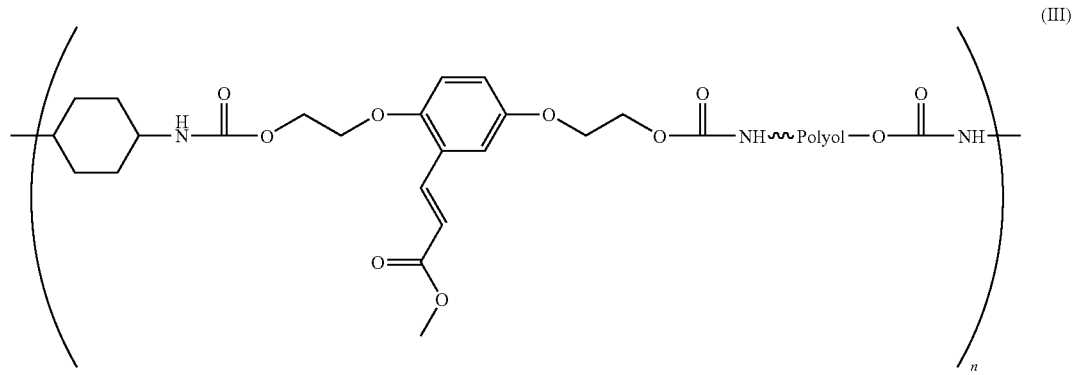

(III)

Reaction Scheme (III)

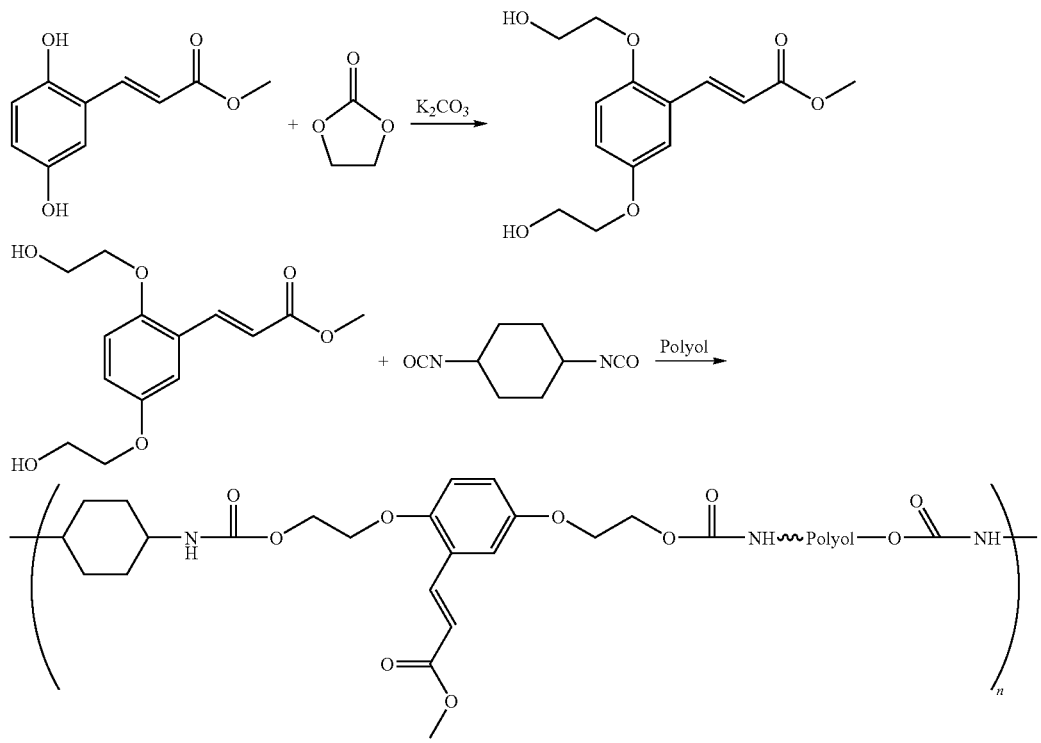

Alternatively, the diisocyanate and the diols containing photoalignable functional groups disclosed in Reaction Scheme (II) and (III) may be used directly in the sealing composition. In this case, a photoalignable polymer will be formed in-situ during or after hardening of the sealing layer.

Formula IV

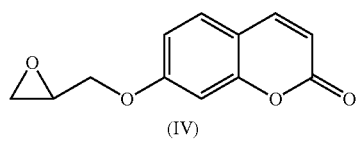

(IV)

Alcohol-soluble photoalignable copolymers of Formula (IV) may be synthesized from 7-hydroxycoumarin by procedures shown in Reaction Scheme (IV) below. Suitable copolymers for the polymer modification include, but are not limited to, acrylic acid copolymers, maleic anhydride copolymers such as vinylether-co-maleic anhydride, 2-hydroxyethylacrylate copolymers and the like. Alternatively, hydroxyl coumarin or cinnamic acid may be reacted with glycidyl acrylate or glycidyl methacrylate, and subsequently copolymerized with vinyl monomers to obtain alcohol soluble photoalignable copolymers.

Reaction Scheme (IV)

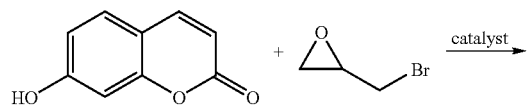

-continued

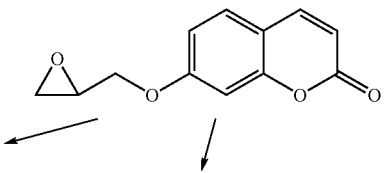

Ring opening homopolymerization or copolymerization with other epoxides

Reaction with functional polymers with pendant groups such as carboxylic acid, acid anhydride, hydroxy, amino groups Formula V

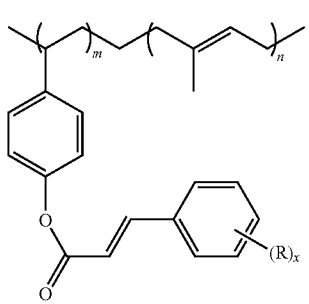

(V)

wherein x is an integer from 0 to 5;

m and n are integers and their sum is $\geq 30$, preferably $\geq 100$; and

R is alkyl, aryl, alkylaryl, alkoxy, aryloxy, dialkylamino, diarylamino or cyano, preferably having 1-12 carbon atoms.

Block copolymers of Formula (V) containing photoalignable groups may also be synthesized by, for example, block copolymerization of p-(t-butyldimethylsiloxy)styrene or p-(t-BOC)styrene with a diene such as butadiene, isoprene or 1,3-pentadiene followed by acid deprotection to yield poly(hydroxystyrene-b-diene) which in turn is treated with a cinnamoyl chloride derivative as shown in Reaction Scheme V below. The resultant block polymer has a photoalignable block and a block that is highly soluble in hydrocarbon solvents (such as hexane, cyclohexane, heptane or other Isopars). Upon coating onto a LC composition, the photoalignable block tends to migrate to the interface with the LC composition to maximize the alignment efficiency.

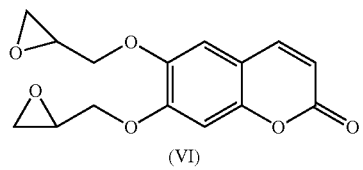

(VI) Formula VI

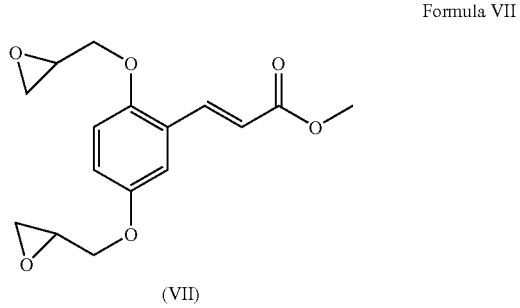

(VII) Formula VII

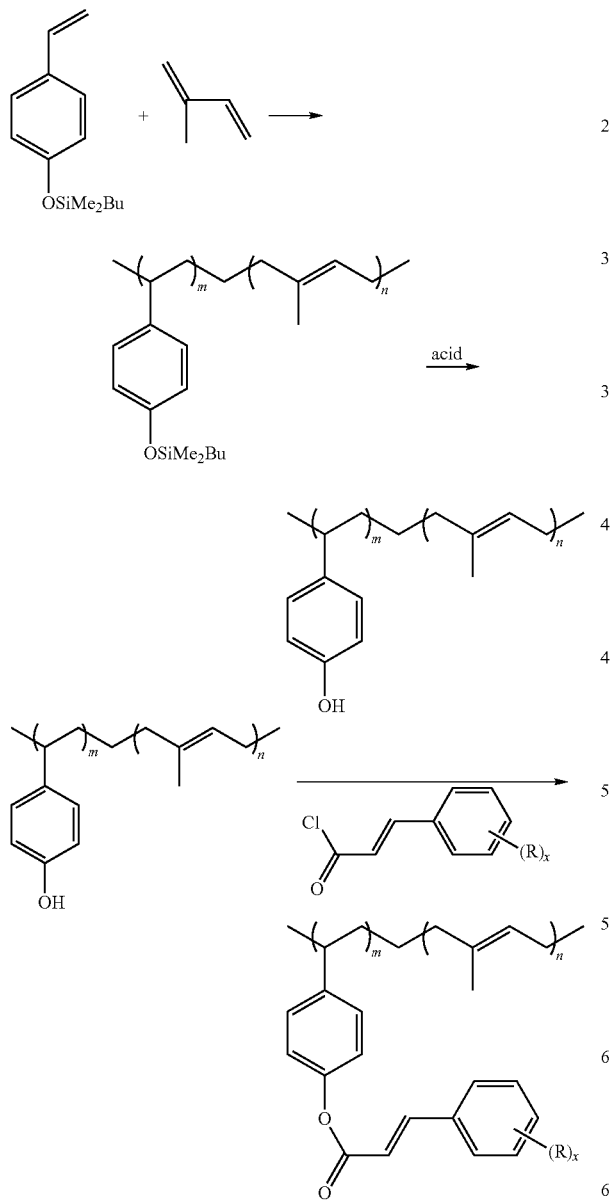

Reaction Scheme (V)

Precursors of photoalignable polymers of Formula (VI) or (VII) such as diepoxy-functionalized coumarin and diepoxy-functionalized cinnamate derivatives may be synthesized according to Reaction Schemes (VI) and (VII), respectively as shown below. Polyisocyanate or diisocyanate carrying a cinnamate or coumarin group may also be synthesized by reacting the corresponding diol compound of Formula (VI) or (VII) with a diisocyanate such as toluene diisocyanate or isophorone diisocyanate.

Reaction Scheme (VI)

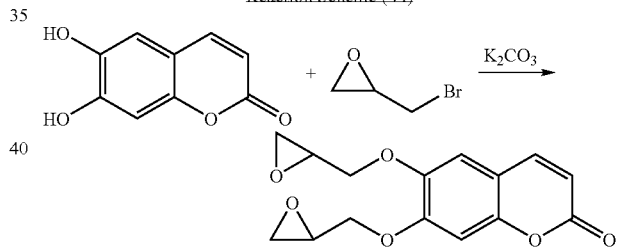

Reaction Scheme (VII)

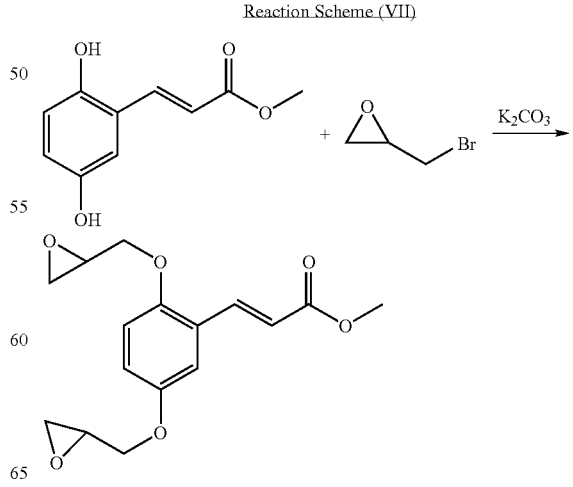

III. Assembly Process of the Present Invention

Briefly, the assembly process comprises (a) adding and processing a first alignment layer on a first substrate optionally comprising a conductive layer, (b) constructing edge walls on the first alignment layer by a method such as printing, coating or photolithography to define the display periphery, (c) constructing or applying spacers on the first alignment layer, (d) filling and top-sealing the display cell(s) defined by the spacers and the edge walls with a photoalignable top-sealing layer by a one-pass or two-pass top-sealing process, (e) hardening and photoalign the photoalignable layer, either simultaneously or sequentially, and finally (f) disposing a second substrate or electrode layer over the top-sealed display cell(s) by a method such as lamination, coating, printing, vapor deposition, sputtering or a combination thereof, optionally with an adhesive or overcoat which itself may be a photoalignable layer or a pre-aligned layer.

After the above steps are completed, polarizer(s) and other optical films may be applied to the assembled display panel and driver circuitry is subsequently mounted. A backlight may also be installed for transmissive or transflective devices. The assembly process of this invention may be carried out by a continuous conveyor or web process. The process not only dramatically improves the throughput and yield, but also enables the formation of large-size liquid crystal displays in an efficient manner.

Details of the assembly process are given below.

(1) Construction of the Bottom Substrate (12)

Fabrication of the bottom or the first substrate (12) optionally comprising a conductor layer may be accomplished by any of the methods known in the art, details of which can be found in "Liquid Crystal Flat Panel Displays" by William C. O'Mara, 1993.

The first alignment layer (12a) may be deposited on the substrate (12). If a conductor layer (12b) is present, the alignment layer (12a) is coated or deposited onto the conductor side (12b) on the substrate. The first alignment layer (12a) may be the same as those typically used in LCD manufacturing such as a polyimide, a surfactant, a coupling agent or a photoalignment polymer or oligomer. After deposition and baking, the first alignment layer may be aligned by rubbing or exposure to a polarized light. In some applications, a diamond turn may be used to create microgrooves or grating structures for the LC alignment.

In general, the photoalignment polymers or oligomers may have a photoalignment functional group on the main chain or a side chain. The precursors of the photoalignment polymers and copolymers having a photoalignable functional group on the main chain or a side chain may also be useful. The functional groups may include, but are not limited to, cinnamate, coumarin, chalcony, benzolidenenaphthalidine, benzaylideneacetophenone, diphenylacetylene, stilbazole, stilbene, diphenylacetylene, diazo, spiropyran and the like. While only certain groups of photoalignment polymers or oligomers are specifically mentioned below, it is understood that all of the conventional photoalignable polymers may be used as the first alignment layer (12a) on the bottom substrate in the assembly process of the present invention.

For example, photosensitive copolymers containing a cinnamate, coumarin, chalcony or diphenylacetylene group on the side-chain have been used as a photoalignment layer (see V. G. Chigrinov, et al, U.S. Pat. No. 5,389,698; M. Schadt et al, J. SID 1997 May 4, 367; Y. Makita et al, J. Photopoly. Sci. Technol. 1998, 11, 187; M. Obi et al, Chem. Mater. 1999, 11, 1293-1301; O. Yaroshchuk, SID 00 Digest, pp-443-445; and J. Kim et al., SID 01 Digest, pp. 806-809) for liquid crystal devices. The photoalignment copolymers may be dissolved in, for example, N-methylpyrrolidone and applied to the substrate by roll transfer coating or spin coating.

Polymers with chromophores on the main chain (S Song et al, Jp. J. Appl. Phs. 1998, 37, 2620) and polyesters containing a phenylenediacryloyl group on the main chain may also be used as a photoalignment layer.

Polymethacrylates with a benzylidenephthalimide side chain may also be used as a photoalignment layer ("Polymethacrylate with Benzylidenephthalimide Side-chains, Photocontrol of Alignment of a Nematic Liquid Crystal", Macromol. Chem. Phys. 1998, pp-199, 363-373 and 375-383 by D. Suh) through polarized E/Z photoisomerization. Copolymers of styrene or polyphenylmaleimide containing ω-(4-chaconyloxy)alkyl group on both the styrene units and phenylmaleimide units (see M. Kimura et al., SID 01 Digest, pp. 1162-1165 and SID 00 Digest, pp. 438-441; S, Nakata et al., SID 01 Digest, pp. 802-805) are also useful.

A group of linear and cyclic polymers or oligomers having a photoreactive ethylene group used as an alignment layer are disclosed in U.S. Pat. No. 5,539,074. The monomer units of this group of photopolymers include acrylate, methacrylate, 2-chloroacrylate, 2-phenylacrylate, acryloylphenylene, acrylamide, methacrylamide, 2-chloroacrylamide, 2-phenylacrylamide, vinyl ether, styrene derivatives, vinyl ester, maleic acid derivatives, fumaric acid derivatives, siloxanes and epoxides. Acrylate, methacrylate, 2-chloroacrylate, acrylamide, methacrylamide, 2-chloroacrylamide, styrene derivatives and siloxanes are the preferred monomers.

Another alternative is an azo or fluorinated azo dye film, particularly the azo dye/polyimide mixture [see W. C. Yip et al, SID 01 Digest, pp 1170-1173; and W. Gibbon, et al, Nature, London, 351, 49, (1991); V. Vorflusev, et al, Mol. Crysta. Liq. Cryst., 263, 577 (1995)].

In addition, the alignment layer (12a) may also be formed from a novel photoalignment polymer, oligomer or a precursor thereof as described in Section II above.

(2) Construction of Spacers

An edge wall (13a) and spacers (13) may be deposited on the first alignment layer (12a) of the bottom substrate (12) by a method such as printing, coating, embossing or photolithography. Photolithography using a negatively working photoresist is preferred for the present invention since a highly smooth surface may be easily obtained. The spacers may be of any shape, preferably with a flat top surface as shown in FIG. 2. Additional spacer particles or fibers may be sprayed onto the aligned substrate. The height of the spacers and edge coating may be in the range of about 1 to about 20 um, preferably in the range of about 2 to about 8 um. To improve the tenting properties of the subsequent photoalignable top-sealing layer above the liquid crystal composition, edge walls and spacers with a flat top surface are preferred. The diameter or width of the top surface of the spacers may be in the range of about 2 to about 30 microns, preferably in the range of about 5 to about 15 microns. The thus prepared bottom substrate is referred to hereinafter as the "finished bottom substrate" or the "top-opened display cell(s)" (14). It comprises a substrate, edge walls and spacers to define the active area and cell gap of the display. The finished bottom substrate (14) may also comprise a conductor layer (12b), the first alignment layer (12a) or both. The first alignment layer (12a), if present, may be aligned by rubbing before the edge walls or spacers are built on the substrate. When a photoalignable layer is used as the first alignment layer (12a), photoalignment may be accomplished using a polarized (UV) light after the edge walls and spacers are constructed. If a conductor or electrode layer (12b) is present, the first alignment layer (12a), the edge walls (13a) and spacers (13) are on the side of the conductor layer.

The edge walls (13a) are needed to confine the liquid crystal composition within the active cell. The edge walls may be formed by printing or coating a thermal or radiation curable material onto the first alignment layer of the first substrate. The spacers (13) not only define the cell gap, but also serve as the support for the photoalignable top-sealing layer to form a seamless seal above the liquid crystal composition. The edge walls and the spacers may be formed from conventional edge seal adhesives such as epoxy and silicone resins commonly used in the LCD industry. Preferably, the edge walls and spacers are formed from UV curable resins including negatively working photoresists.

(3) Liquid Crystal Materials

Liquid crystal compositions (15) that may be used in the present invention are well known in the art. The novel assembly process is suitable for LCDs such as twisted-nematic (TN), super twisted nematic (STN), guest host, cholesteric, ferroelectric or dispersed types of LCDs.

Examples of liquid crystal materials that may be used in the present invention include, but are not limited to, E7, TL205, TL213, BL006, BL009, BL037, ME5N.F, CCP-30CF3, PCH-3, CCP-3F.F.F, MLC mixture series from Merck KGaA (Darmstadt, Germany); 5HBF3, 5PCL, and 5HPFF from Chisso Corp. (Japan); and CCG-V-F, ME2N.F, and CPTP-3-2 from Dainippon Ink & Chemicals, Inc., (Japan). Review of liquid crystal materials may be found in W. C. O'Mara, "Liquid Crystal Flat Panel Displays" by Van Nostrand Reinhold, (1993); T. J. Bunning, et al, ed., "Liquid Crystals for Advanced Technologies", Materials Research Soc. Symp. Proceedings, Vol. 425 (2000); S. T. Wu and D. K. Yang, "Reflective Liquid Crystal Displays", John Wiley & Son, Ltd, (2001); N. March and M. Tosi, ed., "Polymers, Liquid Crystals, and Low-Dimensional Solids", Plenum Press (1984); G. W. Gray, and J. W. Goodby, "Smetic Liquid Crystals, Textures and Structures", Leonard Hill (1984); "P. Kirsch, et al, Mol. Cryst. Liq. Cryst., 346, 193 (2000) and Angew. Chem. Int. Ed., 39, 4216 (2000); T. Broschard, et al, IDW'00, paper FMC-3-1, Kobe, Japan (2000).

In guest-host systems, dichroic guest dyes including arylazo or poly(arylazo) dyes may be used. Suitable dichroic dyes include Blue AB2, Red AR1 and Yellow AG1 from Funktionfluid Gmb (Germany) and SI-486 (yellow), SI426 (red), M483 (blue), S344 (black), S428 (black) and S7 (black) from Mitsui Toatsu. Nonionic azo and anthraquinone dyes may also be used in some cases. Examples include, but are not limited to, Oil Red EGN, Sudan Red, Sudan Blue, Oil Blue, Macrolex Blue, Solvent Blue 35, Pylam Spirit Black and Fast Spirit Black from Pylam Products Co., Arizona, Sudan Black B from Aldrich, Thermoplastic Black X-70 from BASF, anthroquinone blue, anthroquinone yellow 114, anthroquinone red 111, 135 and anthroquinone green 28 from Aldrich. In any case, the dyes must be chemically stable.

(4) Filling and Top-sealing of Display Cell(s)

After the finished bottom substrate (14) which may also be called a top-opened display cell, is constructed, it is filled with a liquid crystal composition (15) and top-sealed with a photoalignable sealing layer (16) by either a one-pass or two-pass top-sealing process. In either case, the display cell is top-sealed before the top substrate (11) is joined onto the finished bottom substrate (14).

In the "one-pass filling and top-sealing method", a photoalignable composition of the present invention is predispersed in a liquid crystal composition by, for example, an in-line blender, and immediately coated onto the finished bottom substrate by Myrad bar, gravure, doctor blade, slot coating or slit coating. The photoalignable composition is immiscible with the liquid crystal composition and has a specific gravity lower than that of the liquid crystal composition. Excess fluid may be scraped away by a wiper blade or a similar device. The photoalignable top-sealing composition floats to the top and forms a supernatant layer above the liquid crystal layer.

Alternatively, the liquid crystal composition and the photoalignable top-sealing composition of the present invention may be coated sequentially onto the finished bottom substrate by a "two-pass" sealing process. In this method, the top-sealing of the cells may be accomplished by first filling a liquid crystal composition into the top-opened display cell defined by the finished bottom substrate (14), scraping away excess fluid by, for example, a rubber blade, and followed by overcoating a photoalignable top-sealing composition of the invention over the liquid crystal layer. Interfacial polymerization or crosslinking at the interface between the liquid crystals and photoalignable layer may be beneficial to the sealing process. Intermixing between the liquid crystal composition and the photoalignable overcoat can be significantly suppressed by the formation of a thin barrier layer at the interface by the interfacial polymerization or crosslinking reaction. To further reduce the degree of intermixing, it is highly desirable that the specific gravity of the photoalignable top-sealing composition is no greater than that of the liquid crystals.

Volatile organic solvents as described above may be used to adjust the viscosity and specific gravity of the photoalignment composition, and the dry thickness of the coating. When a volatile solvent is used in the photoalignable top-sealing composition, it is also preferred that it is immiscible with the liquid crystal composition and has a specific gravity no greater than that of the liquid crystal phase. The two-pass overcoating process is particularly useful when the component(s) of the liquid crystal phase is at least partially soluble in the photoalignment composition, or vice versa. To further reduce the degree of intermixing between the photoalignable layer and the liquid crystal phase, the filled display bottom substrate may be chilled before the photoalignable composition is overcoated.

Solvents, thickeners or additives may also be used in the two-pass process to optimize the rheology, wetting and tenting properties for the two-pass sealing method.

The hardening of the photoalignable top-sealing composition in either method described above may be accomplished by heat, moisture, solvent evaporation or exposure to radiation such as a polarized (UV) light. The polarized (UV) light may be used to simultaneously harden the photoalignable top-sealing composition and align the liquid crystals through the photoalignable layer. Alternatively the photoalignable layer may be hardened first by other means, and subsequently photoaligned by exposure to a polarized light. The top-sealing layer (16) formed by either the one-pass or two-pass process not only seamlessly encloses the liquid crystal composition within the display cell(s), but also serves as the alignment layer for the liquid crystal composition.

A top substrate or electrode layer (11) is then disposed onto the top-sealed and aligned liquid crystal cell by a method such as lamination, coating, printing, vapor deposition, sputtering or a combination thereof, to form the liquid crystal panel ready for module assembly. An additional layer (17) such as an adhesive, overcoat layer or color filter may be added between the top substrate or electrode plate and the photoaligned sealing layer to improve the process latitude or display performance. Alternatively the top substrate may be disposed onto the top-sealing layer first, and the latter is subsequently photoaligned with a polarized (UV) light through one of the substrate(s). Optionally, the polarized light exposure may be carried out under an electric field to further enhance the efficiency of photoalignment.

The top-sealing/photoalignment layer may have a thickness in the range of about 1 to about 20 microns, preferably from about 1 to about 8 microns and more preferably from about 2 to about 4 microns.

Figure 3:
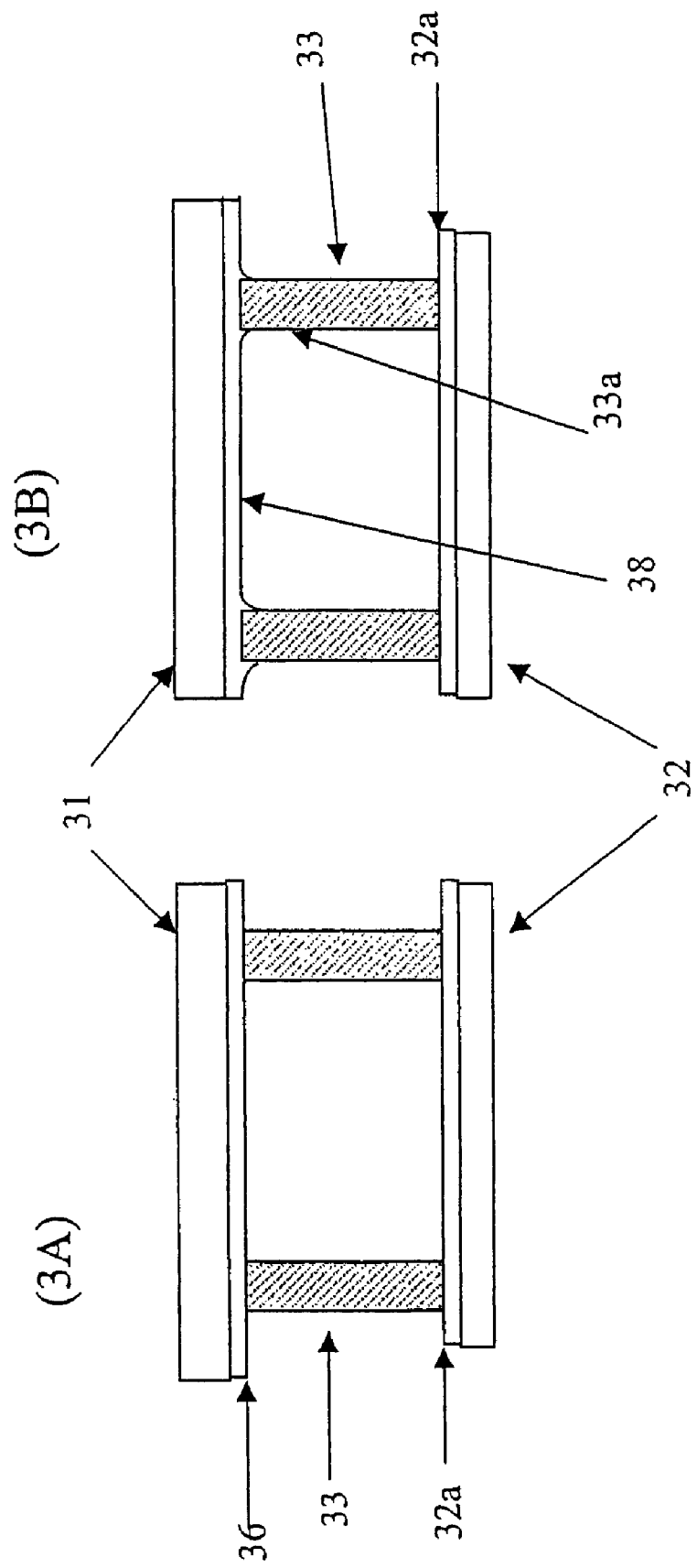
FIG. 3A illustrates a typical LCD cell top-sealed by the traditional edge-seal method.
FIG. 3B shows a LCD cell top-sealed by a process of the present invention.

Two schematic top-sealed LC cells of the present invention are shown in FIGS. 3A and 3B. FIG. 3A illustrates a typical LCD cell edge-sealed by a traditional edge-sealing adhesive. In FIGS. 3A, 31, 32, 32a, 33 and 36 are the second (top) substrate, the first (bottom) substrate, the first alignment layer, the spacers or edge walls and the second alignment layer, respectively. The second substrate (31)/alignment layer (36) simply sits on the spacers and either no or negligible wetting curvature may be found between the spacers (33) and the alignment layer (36). FIG. 3B shows a LCD cell top-sealed by a process of the present invention. In FIGS. 3B, 31, 32, 32a, 33 and 38 are the second (top) substrate, the first (bottom) substrate, the first alignment layer, the spacers or edge walls and the second and top-sealing alignment layer, respectively. In one embodiment, the top-sealing alignment layer (38) may be in contact with the inside surface (33a) of the spacers or edge walls (33). In another embodiment, as shown in FIG. 3B, there may be a wetting curvature at the interface between the spacers or edge walls (33) and the top-sealing photoalignment layer (38). Such a wetting curvature may be beneficial for improved tenting and adhesion properties. However, the curved portion should be kept small to achieve a wider viewing area (or a higher aperture ratio).

(5) Final Steps

The final steps of the novel assembly process are carried out by methods known in the art (see, for example, "Liquid Crystal Flat Panel Displays" by William C. O'Mara, 1993).

One of the final steps of the assembly process for the liquid crystal displays is the application of the polarizer to the outside of each substrate. Polarizer films are composite films which contain the pressure sensitive adhesive layer needed to attach the polarizer to the glass. The direction of polarization is selected for each side of the glass substrate. Usually, if the liquid crystal composition has a twist of a certain angle, then the polarizers will be set at this angle with respect to one another. This allows light passing from one side and rotated by the liquid crystals to pass through the other side, a "normal" white condition.

In some cases, a retarder or compensation film is applied prior to the polarizer. Compensation films are useful for correction of a distinct yellow or blue color in STN displays. True black and white displays can be obtained, and viewing angle is also increased using compensation films. Suitable film materials include polycarbonate and polymethyl methacrylate.

A completed display will ordinarily have driver integrated circuits mounted on or near one of the glass substrates. The mounting is accomplished by conventional means. Backlighting for the liquid crystal displays are also known in the art and is described in "Liquid Crystal Flat Panel Displays" by William C. O'Mara, 1993.

It should be noted that the novel assembly process of the present invention can also be carried out in an automated manner continuously or semi-continuously. A conveyor type of assembly process is particularly suitable for LCD assembling.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A photoalignable top-sealing composition for top-sealing and aligning a liquid crystal composition filled in a top-opened display cell, which photoalignable top-sealing composition comprises a photoalignable polymer, oligomer or a precursor thereof dissolved or dispersed in a sealing solvent or solvent mixture, wherein said photoalignable polymer, oligomer or a precursor thereof comprises a photoalignable function group on the main chain or a side chain, characterized in that said photoalignable function group is selected from the group consisting of cinnamate, coumarin, chalcony, benzolidenenaphthalidine, benzalideneacetophenone, diphenylacetylene, stilbazole, stilbene, diazo and spriopyran.

2. The composition of claim 1 which has a specific gravity no greater than that of the liquid crystal composition and is immiscible with the liquid crystal composition.

3. The composition of claim 1 wherein said photoalignable polymer, oligomer or a precursor thereof comprises a hydrocarbon repeating unit and the photoalignable functional group on the main chain or the side chain.

4. The composition of claim 1 wherein said photoalignable polymer, oligomer or a precursor thereof comprises a siloxane repeating unit and the photoalignable functional group on the main chain or the side chain.

5. The composition of claim 1 wherein said photoalignable polymer, oligomer or a precursor thereof comprises an acrylate, methacrylate or vinyl repeating unit and the photoalignable functional group on the main chain or the side chain.

6. The composition of claim 1 wherein said photoalignable polymer, oligomer or a precursor thereof comprises a repeating unit of a condensate of urethane, urea, carbonate, ester, amide, sulfone, imide, epoxide or formaldehyde and the photoalignable functional group on the main chain or the side chain.

7. The composition of claim 1 wherein said photoalignable polymer, oligomer or a precursor thereof is a random copolymer, a graft copolymer, a branch copolymer or a block copolymer having the photoalignable functional group in the main chain or the side chain.

8. The composition of claim 1 wherein said photoalignable polymer, oligomer or a precursor thereof is a block copolymer with at least one photoalignable block having the photoalignable functional group on the main chain or the side chain and another block(s) that is/are compatible with a said sealing solvent or solvent mixture or non-photoalignment polymers, if present, in the composition.

9. The composition of claim 1 wherein said photoalignable polymer, oligomer or a precursor thereof is a graft copolymer having at least one photoalignable graft chain and the main chain that is compatible with said sealing solvent or solvent mixture or non-photoalignable polymers, if present, in the composition.

10. The composition of claim 1 which comprises a precursor of a said photoalignable polymer or oligomer.

11. The composition of claim 1 wherein said photoalignable polymer, oligomer or a precursor thereof is selected from the group consisting of the following:

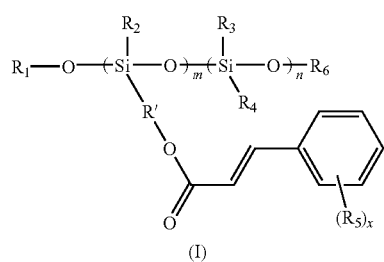

(I)

Formula I wherein x is an integer of 1-5;
m and n are integers and their sum is $\geq 20$, preferably $\geq 50$,
$R_1$, $R_2$, $R_3$, $R_4$ and $R_5$ are independently alkyl, aryl, alkylaryl or heteroatom derivatives thereof, substituted or unsubstituted alkylsilyl derivatives;
$R_6$ is a trimethylsilyl; and
R' is a linking group such as alkylene, cycloalkylene or phenylene;

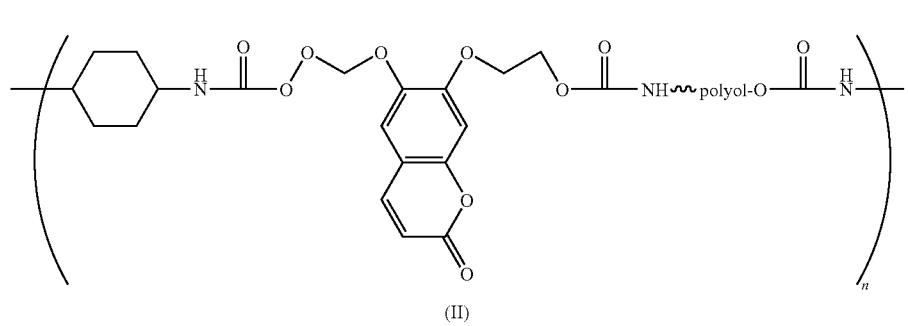

(II)

Formula II wherein n is integer $\geq 1$; and the polyol moiety is formed from polyethylene glycol, polypropylene glycol, poly tetramethylene glycol, polyester diol, polyalkylene diol or a fluorinated polyether diol;

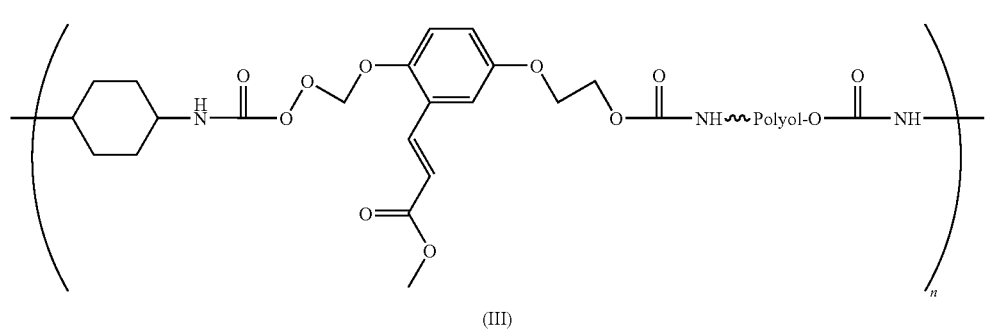

(III)

Formula III

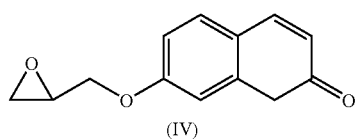

(IV)

Formula IV

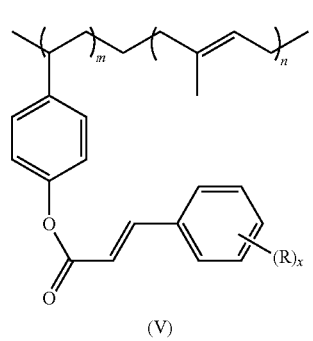

(V)

Formula (V)

wherein n is an integer $\geq 1$; and the polyol moiety is formed from polyethylene glycol, polypropylene glycol, poly tetramethylene glycol, polyester diol, polyalkylene diol or a fluorinated polyether diol;

wherein x is an integer from 0 to 5;
m and n are integers and their sum is $\geq 30$; and
R is alkyl, aryl, alkylaryl, alkoxy, aryloxy, dialkylamino, diarylamino or cyano;

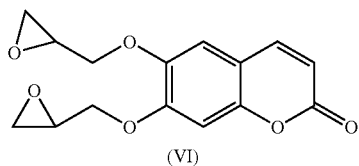

(VI) Formula VI

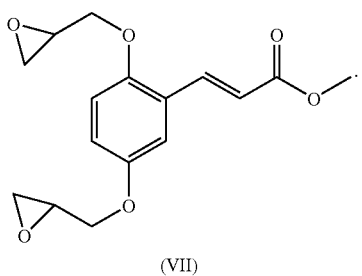

(VII) Formula VII

12. The composition of claim 1 wherein said sealing solvent or solvent mixture has a specific gravity no greater than the liquid crystal composition and is immiscible with the liquid crystal composition.

13. The composition of claim 12 wherein said sealing solvent or solvent mixture is selected from the group consisting of straight, branched or cyclic $C_{1-12}$ hydrocarbons, $C_{1-4}$ alcohols, water and mixtures thereof.

14. The composition of claim 13 wherein said hydrocarbon solvent is selected from the group consisting of hexane, cyclohexane, heptane, octane, nonane, decane and decalin.

15. The composition of claim 13 wherein said alcohol is methanol, ethanol, 1-propanol, 2-propano1,1-butanol, 2-butanol or t-butanol.

16. The composition of claim 1 wherein the concentration of said photoalignable polymer, oligomer or a precursor thereof in the sealing solvent or solvent mixture is in the range of about 3 to about 25% by weight.

17. The composition of claim 16 wherein the concentration of said photoalignable polymer, oligomer or a precursor thereof in the sealing solvent or solvent mixture is in the range of about 5 to about 15% by weight.

18. The composition of claim 1 further comprising a non-photoalignable polymer.

19. The composition of claim 18 wherein said non-photoalignable polymer is a polymeric binder or thickener.

20. The composition of claim 1 further comprising a low molecular weight photoalignable dichroic compound.

21. The composition of claim 20 wherein said photoalignable dichroic compound has a molecular weight of less than about 1000.

22. The composition of claim 21 wherein said photoalignable dichroic compound is selected from the group consisting of azobenzenes, stilbenes and spiropyrans.

23. A photoalignable polymer, oligomer or a precursor thereof represented by one of the following formulas:

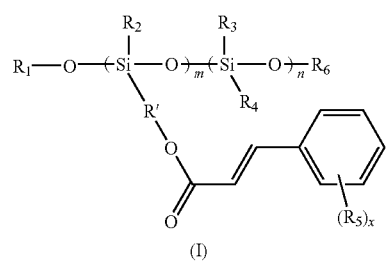

(I) Formula I wherein x is an integer of 1-5;

m and n are integers and their sum is $\geq 20$;

$R_1$, $R_2$, $R_3$, $R_4$ and $R_5$ are independently alkyl, aryl, alkylaryl or heteroatom derivatives thereof, substituted or unsubstituted alkylsilyl derivatives;

$R_6$ is trimethylsilyl; and

R' is a linking group such as alkylene, cycloalkylene or phenylene;

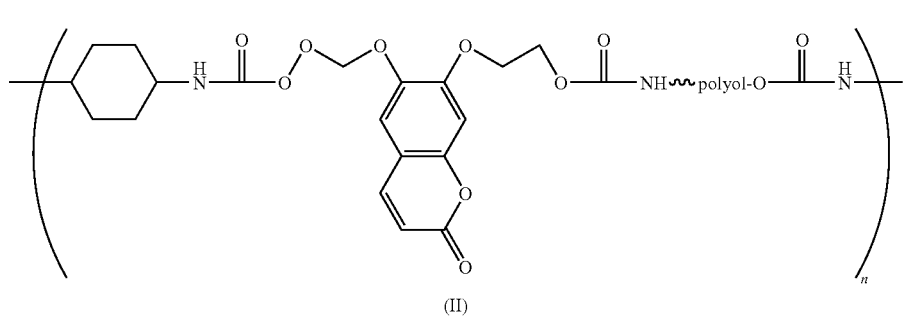

(II) Formula II wherein n is integer $\geq 1$; and the polyol moiety is formed from polyethylene glycol, polypropylene glycol, poly tetramethylene glycol, polyester diol, polyalkylene diol or a fluorinated polyether diol;

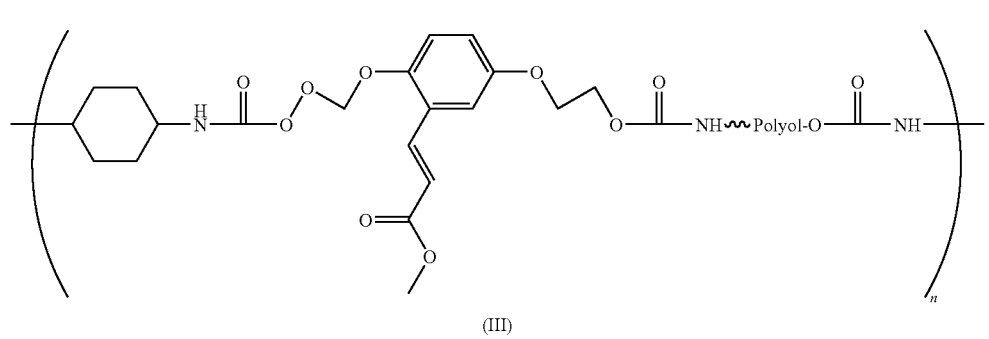

Formula III (III)

wherein n is an integer ≧1; and the polyol moiety is formed from polyethylene glycol, polypropylene glycol, poly tetramethylene glycol, polyester diol, polyalkylene diol or a fluorinated polyether diol;

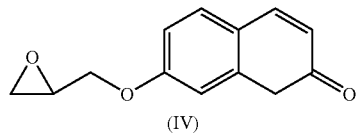

Formula IV (IV)

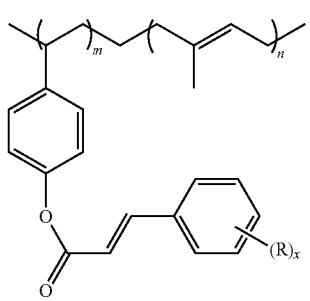

Formula (V)

(V)

wherein x is an integer from 0 to 5;
m and n are integers and their sum is ≧30;
and R is alkyl, aryl, alkylaryl, alkoxy, aryloxy, dialkylamino, diarylamino or cyano;

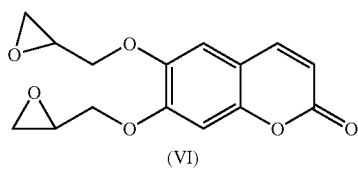

Formula VI (VI)

-continued

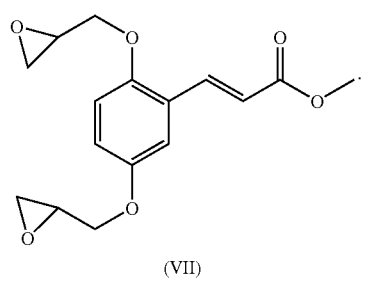

Formula VII (VII)

24. The composition of claim 11 wherein in Formula I each of $R_1$ and $R_6$ is trimethylsilyl and each of $R_2$, $R_3$ and $R_4$ is methyl.

25. The composition of claim 11 wherein the photoalignable polymer, oligomer or a precursor thereof is represented by Formula II, III, IV, V, VI or VII.

26. The photoalignable polymer, oligomer or a precursor thereof of claim 23 which is Formula I in which each of $R_1$ and $R_6$ is trimethylsilyl and each of $R_2$, $R_3$ and $R_4$ is methyl.

27. The photoalignable polymer, oligomer or a precursor thereof of claim 23 which is represented by Formula II, III, IV, V, VI or VII.

* * * * *